(12) United States Patent
Topiwala et al.

(10) Patent No.: US 9,099,091 B2
(45) Date of Patent: Aug. 4, 2015

(54) METHOD AND APPARATUS OF ADAPTIVE TEXTUAL PREDICTION OF VOICE DATA

(71) Applicant: Nuance Communications, Inc., Burlington, MA (US)

(72) Inventors: Diven Topiwala, Reading (GB); Uwe Helmut Jost, Maidenhead (GB); Lisa Meredith, Reading (GB); Daniel Almendro Barreda, London (GB)

(73) Assignee: Nuance Communications, Inc., Burlington, MA (US)

( * ) Notice: Subject to any disclaimer, the term of this patent is extended or adjusted under 35 U.S.C. 154(b) by 335 days.

(21) Appl. No.: 13/746,847

(22) Filed: Jan. 22, 2013

(65) Prior Publication Data

US 2014/0207451 A1    Jul. 24, 2014

(51) Int. Cl.

| G10L 15/32 | (2013.01) |
| G10L 15/26 | (2006.01) |
| G10L 15/22 | (2006.01) |
| G10L 15/08 | (2006.01) |
| G10L 15/183 | (2013.01) |

(52) U.S. Cl.
CPC ............... G10L 15/26 (2013.01); G10L 15/32 (2013.01); G10L 15/083 (2013.01); G10L 15/183 (2013.01); G10L 2015/227 (2013.01)

(58) Field of Classification Search
CPC ............................... G10L 15/26; G10L 15/32
USPC ........................................................ 704/235
See application file for complete search history.

(56) References Cited

U.S. PATENT DOCUMENTS

| 7,912,700 B2 * | 3/2011 | Bower et al. .................... 704/9 |
| 7,953,692 B2 * | 5/2011 | Bower et al. .................... 706/50 |
| 8,521,663 B1 * | 8/2013 | Phillips et al. .................. 706/12 |
| 8,756,052 B2 * | 6/2014 | Walker et al. ................... 704/9 |

* cited by examiner

*Primary Examiner* — Susan McFadden
(74) *Attorney, Agent, or Firm* — Hamilton, Brook, Smith & Reynolds, P.C.

(57) ABSTRACT

Typical textual prediction of voice data employs a predefined implementation arrangement of a single or multiple prediction sources. Using a predefined implementation arrangement of the prediction sources may not provide a good prediction performance in a consistent manner with variations in voice data quality. Prediction performance may be improved by employing adaptive textual prediction. According to at least one embodiment determining a configuration of a plurality of prediction sources, used for textual interpretation of the voice data, is determined based at least in part on one or more features associated with the voice data or one or more a-priori interpretations of the voice data. A textual output prediction of the voice data is then generated using the plurality of prediction sources according to the determined configuration. Employing an adaptive configuration of the text prediction sources facilitates providing more accurate text transcripts of the voice data.

20 Claims, 4 Drawing Sheets

|  | NO FIRST AGENT | FIRST AGENT |
|---|---|---|
| LATTICE | 0.75 | 0.7 |
| LM | 1 | 0.9 |
| FIRST AGENT | - | 1 |

FIG. 3A

|  | NO FIRST AGENT | FIRST AGENT |
|---|---|---|
| LATTICE | 1 | 1 |
| LM | 1 | 0.9 |
| FIRST AGENT | - | 1 |

FIG. 3B

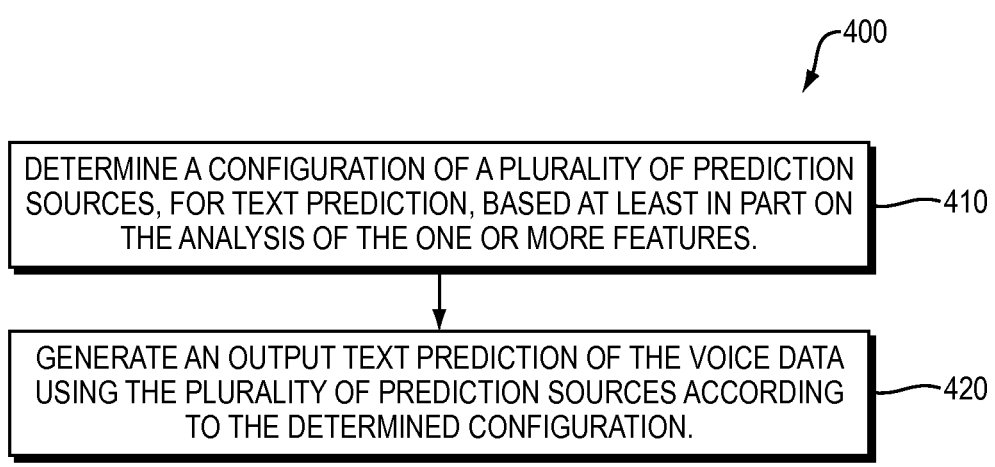

400

| DETERMINE A CONFIGURATION OF A PLURALITY OF PREDICTION SOURCES, FOR TEXT PREDICTION, BASED AT LEAST IN PART ON THE ANALYSIS OF THE ONE OR MORE FEATURES. | 410 |

| GENERATE AN OUTPUT TEXT PREDICTION OF THE VOICE DATA USING THE PLURALITY OF PREDICTION SOURCES ACCORDING TO THE DETERMINED CONFIGURATION. | 420 |

FIG. 4

METHOD AND APPARATUS OF ADAPTIVE TEXTUAL PREDICTION OF VOICE DATA

BACKGROUND OF THE INVENTION

Speech-to-text transcription is commonly used in many applications. The transcription is usually performed by a human agent. However, the use of human agents to transcribe voice data to text is costly, and sometimes the transcription quality is less than satisfactory. With significant advances in speech recognition and language modeling tools, machine-based solutions for speech-to-text transcription are becoming a reality. Such solutions may be used in combination with a human agent or separately.

SUMMARY OF THE INVENTION

According to at least one embodiment, a computerized method or a corresponding apparatus for performing adaptive textual prediction of voice data comprise: determining a configuration of a plurality of prediction sources, used for textual interpretation of the voice data, based at least in part on one or more features associated with the voice data or one or more a-priori interpretations of the voice data; and generating a textual output prediction of the voice data using the plurality of prediction sources according to the configuration determined.

The method further comprises extracting the one or more features associated with the voice data or the one or more a-priori interpretations of the voice data. The one or more features include a signal-to-noise ratio associated with the voice data, complexity measure of a lattice representing at least one a-priori interpretation of the voice data, or an a-priori interpretation of the voice message generated by a human agent. The multiple prediction sources include a language model module, lattice decoder module, or a human agent. The textual output prediction may be provided to a human agent to facilitate generating a final transcript of the voice data. Alternatively, the textual output prediction may be used as the final transcript of the voice data.

In determining the configuration of a plurality of prediction sources, an order according to which the multiple prediction sources are to be applied is determined, weightings associated with the multiple prediction sources are determined, or a subset of the plurality of prediction sources for use in generating the textual output prediction is determined. A representation of the determined configuration may be sent to another device or stored in a database. A database storing a representation of a previous configuration of the plurality of prediction sources may be updated based on the configuration determined. A representation of the determined configuration includes an indication of an order according to which the multiple prediction sources being applied, indication of weightings associated with the multiple prediction sources, or indication of a subset of the plurality of prediction sources for use in generating the textual output prediction.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3A and 3B show tables illustrating example weighting coefficients assigned to different prediction sources under different signal-to-noise ratios.

FIG. 4 is a flow chart illustrating a method of text prediction according to at least one example embodiment.

DETAILED DESCRIPTION OF THE INVENTION

A description of example embodiments of the invention follows.

In transcribing voice data into text, the use of human agents alone may be costly and of poor quality sometimes. Agents transcribing hours-long voice data may be under strict time constraints. The voice data may not always have good audio quality. Such factors may result in unsatisfactory transcription results. To address the issues of cost and quality in speech-to-text transcription, computer-based text prediction tools are employed.

Speech recognition applications known in the art may not provide text transcripts corresponding to input speech signals. Instead, an output of a speech recognition application may be in the form of statistical data illustrating different potential interpretations of a respective input speech signal. In addition, speech recognition applications may process a speech signal on a per-utterance or per-phoneme basis and may not consider linguistic rules or the context of the speech, or conversation, associated with the input speech signal. Therefore, the output of a speech recognition application is usually fed to a text prediction source to generate a text prediction corresponding to the input speech signal. A single source or multiple text prediction sources may be applied to a prior text interpretation, e.g., output of a speech recognition application or a transcript by an agent, of a speech signal. While the use of multiple prediction sources usually results in better performance than using a single prediction source, a single arrangement of how such multiple prediction sources are employed may not provide equally good performance under different conditions. In the following, different embodiments of adaptation of multiple text prediction sources are described.

Figure 1:
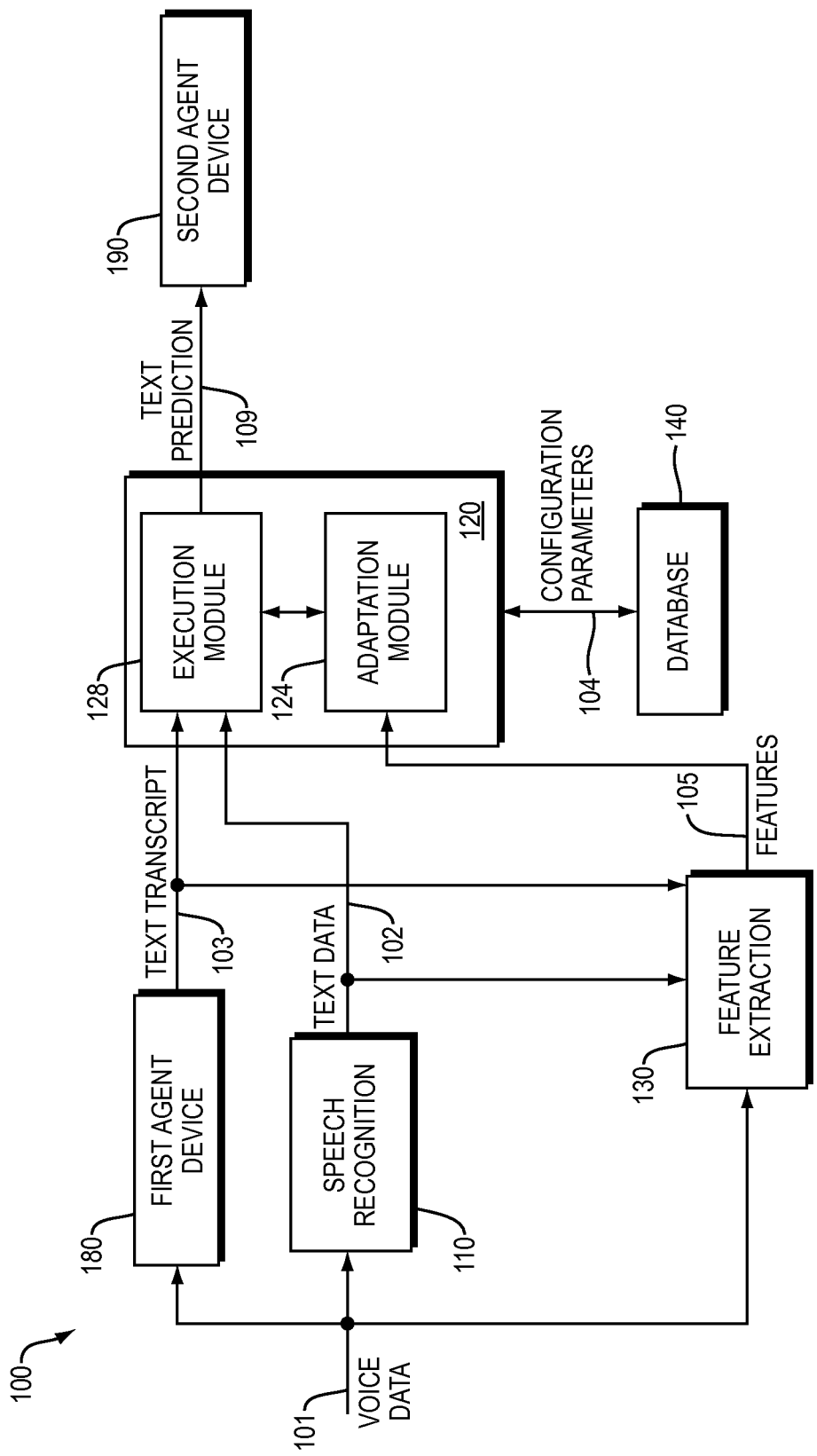
FIG. 1 is a block diagram of a system for speech-to-text transcription according to at least one example embodiment.

FIG. 1 is a block diagram of a system 100 for speech-to-text transcription according to at least one example embodiment. In the system 100, voice data 101, e.g., a speech signal, is fed to a speech recognition module 110. The speech recognition module 110 generates text data 102 as output. The generated text data 102 may be in the form of statistical data with probability values assigned to text words therein. In other words, the generated text data 102 may represent potential multiple interpretations of the voice data. The speech recognition module 110 may include one or more speech recognition applications. A text transcript 103 of the voice data may also be generated by a human agent through a first agent device 180. The output of the speech recognition module 102, the text transcript 103 generated by the agent, or both may be used by the adaptive text prediction module 120 to generate an output text prediction 109 of the respective voice data 101. The output of the speech recognition module 102, the text transcript 103 generated by the agent, or both may be viewed as a-priori text interpretation(s) of the corresponding voice data 101. The output text prediction 109 provided by the adaptive text prediction module 120 may be provided to a second agent, associated with a second agent device 190, to facilitate providing a final text transcript of the respective voice data 101. Alternatively, the output text prediction 109 generated by the adaptive text prediction module 120 may be used as the final text transcript of the respective voice data 101.

In generating the output text prediction 109, the adaptive text prediction module 120 is configured to employ multiple text prediction sources or tools to the a-priori text interpretations. According to at least one example embodiment, the multiple prediction sources are employed according to adaptable configuration(s). Specifically, the adaptive text prediction module 120 includes an adaptation module 124 configured to determine a configuration of the multiple prediction sources based on features 105 associated with the voice data 101, the text data 102 generated by the speech recognition module 110, the text transcript 103, or a combination thereof. The adaptive text prediction module 120 also includes an execution module 128 configured to execute the determined configuration of the multiple text prediction sources.

The features 105 may be provided to the adaptation module 124 by a feature extraction module 130. The feature extraction module extracts the features 105 from voice data 101, text data 102 generated by the speech recognition module 110, text transcript 103 provided by the first agent, or a combination thereof. Examples of the features 105 include, for example, signal-to-noise ratio of the voice data 101, characteristics of the speech recognition module output 102, a measure of the accuracy or quality of text transcript 103, or the like.

Based on the received features 105, the adaptation module 124 determines the configuration of the multiple prediction sources. According to one scenario, the adaptation module 124 may analyze the features 105 to generate further parameters for use in determining the configuration of the multiple prediction sources. Alternatively, the adaptation module 124 may map the received features 105 to a particular configuration based on, for example, a mapping table. According to yet another scenario, the adaptation module 124 may rank or assign a priority value to each of the multiple text prediction sources, based on the received features 105, and then determine a configuration based on the ranking or priority values assigned to each text prediction source. The ranking or priority values may be indicative of which text prediction source is to be employed, the order with which a text prediction source is applied, a weighting to be assigned to the output of a text prediction source, or the like.

According to at least one example embodiment, the adaptive text prediction module 120 is coupled to a database 140. The database 140 may store configuration parameters 104 associated with each configuration, implementations of different configurations, pointers or application programming interfaces (APIs) for implementations of the different configurations or the like. The database 140 may alternatively, or in addition, store APIs or implementations of the multiple text prediction sources. As such, a particular configuration may be implemented on the fly by the adaptive text prediction module 120 using the stored APIs or implementations of the multiple text prediction sources.

Upon determining a configuration of the multiple text prediction sources to be employed, the adaptation module 124 may inform or instruct an execution module 128 about the determined configuration. The execution module 128 is configured to receive the text data 102, the text transcript 103, or both. The execution module 128 then applies the determined configuration of the plurality of text prediction sources to one or more of the received a-priori text interpretations, e.g., 102 and 103. Instructions from the adaptation module may further include an indication of the a-priori text interpretation(s) to be used. Alternatively, such indication may be inherent in the configuration determined or selected by the adaptation module. The execution module may further be configured to retrieve the pointer(s), API(s), or implementation(s) of the selected configuration or of the respective multiple text predictions from the database 140.

By executing the selected configuration of the multiple text prediction sources, the execution module 128 generates an output text prediction 109. The output text prediction 109 may be used as a final text transcript of the voice data 101. Alternatively, the output text prediction 109 may be presented to a second agent, through an agent device 190, to facilitate the generation of the final transcript of the voice data 101 by the second agent. In other words, the second agent may be provided with the voice data audio and the output text prediction 109. According to an example scenario, the output text prediction 109 may be used, for example, as part of an interactive tool which provides or displays prediction(s) of a next word as the second agent types the text transcript of the voice data. According to another scenario, the output text prediction 109 may be presented to the second agent as a document to be reviewed and edited by the second agent while listening to the voice data audio.

Figure 2A:
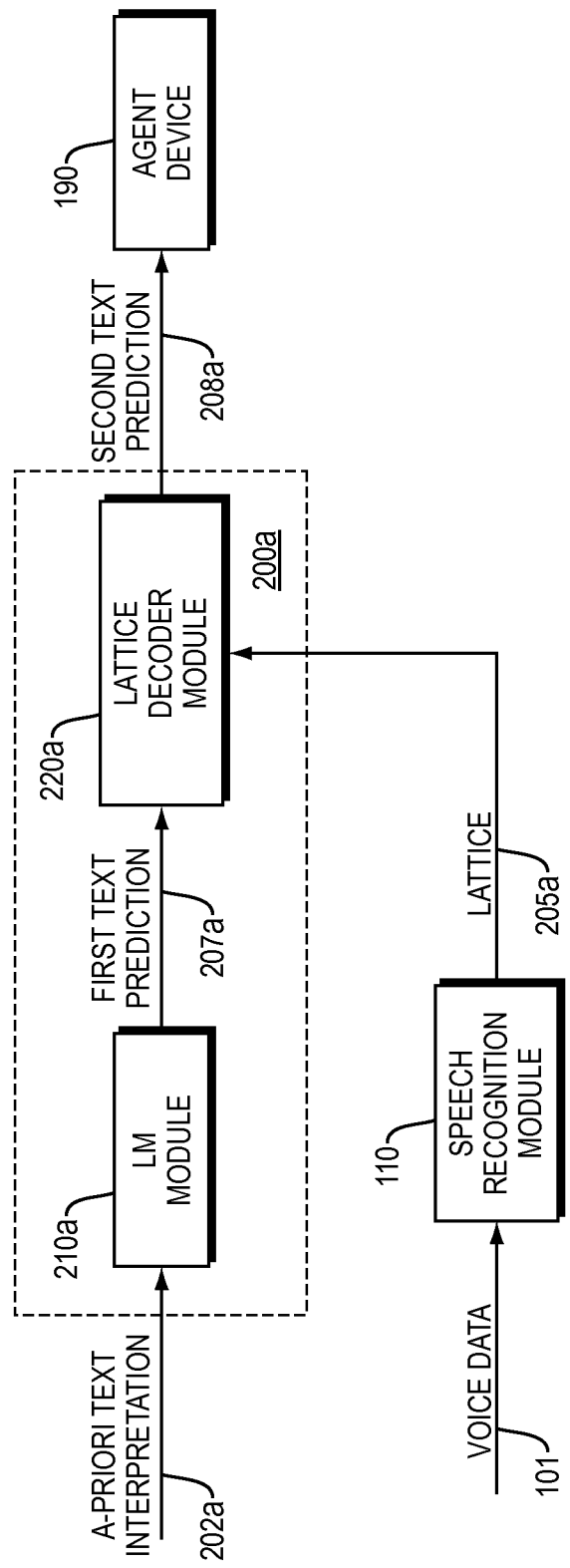
FIG. 2A is a block diagram illustrating an example adaptation of prediction sources for text transcription of voice data.

FIG. 2A is a block diagram illustrating an example configuration 200a of the multiple text prediction sources. The example configuration 200a of the multiple text prediction sources describes a sequential arrangement of two text prediction sources, a language model (LM) module 210a followed by a lattice decoder module 220a. In other words, the a-priori text interpretation 202a, e.g., including text data 102, text transcript 103, or both, is first fed to the LM module 210a, which, in turn, generates a first text prediction 207a. According to another scenario, no input is fed to the LM module and the LM module, in such case, provides the most likely prediction 207a based only on its internal statistical model. For example, for en-US voicemail messages, the LM prediction with no input is likely to be something like "Hi Mike. It's John. Can you call me back?" Where Mike is the most likely recipient name, and John is the most likely caller name. The first text prediction 207a is then fed to the lattice decoder module 220a. The lattice decoder module 220a also receives a lattice 205a from the speech recognition module 110. The lattice is typically a finite state machine representing multiple potential interpretations of the voice data generated by the speech recognition module 110. The lattice decoder module 220a is configured to parse the lattice 205a and generate a second text prediction 208a. The second text prediction 208a corresponds to the output text prediction 109. The second text prediction 208a is generated based on the parsed information in the lattice 205 and the output of the LM module 207a. The LM module 210a may generate more than one text prediction 207a, each with an assigned respective probability or likelihood measure/score. The more than one text predictions 207a generated by the LM module are then used by the lattice decoder module 220a to generate the second text prediction 208a. The lattice decoder module 220a may employ some weighting of the text prediction(s) provided by the LM module 210a and the interpretations embedded in the lattice to generate the second text prediction 208a.

In a sequential configuration, such as 200a, of the multiple text prediction sources, the order of the different text prediction sources is important. For example, in the configuration 200a the LM module 220a is applied first, and the lattice decoder module 210a, is applied second. In an alternative sequential configuration, the lattice decoder module 210a is applied first followed by the LM module 220a. The order of the multiple text prediction sources, or the corresponding configuration, is determined by the adaptation module 124 based on features 105 such as the complexity of the lattice, the signal-to-noise ratio of the voice data 101, the text transcript 103 provided by the first agent, or a combination thereof. With regard to the complexity of the lattice, the more uncertainty is associated with the output of the speech recognition module 110, the more complex the lattice is, and the simpler the lattice is, the more reliable the output of the speech recognition module is. In other words, the complexity of the lattice may be viewed as a measure of the reliability of the lattice.

According to at least one example embodiment, if the lattice is determined, e.g., based on a complexity measure, to be simple, the lattice decoder module 220a is applied in the beginning of a sequential configuration. Considering a configuration having a LM module 210a and a lattice decoder module 220a, for example, the order of the LM module 210a and the lattice decoder module 220a would be reversed compared to the configuration in FIG. 2A when the lattice is found to be relatively simple. According to one scenario, a complexity measure of the lattice is the difference between the likelihood or probability scores associated with the best interpretation, e.g., path with highest probability, and the second best interpretation, e.g., path with second highest probability, in the lattice. The larger the difference between such scores, the simpler the lattice is and vise versa. According to another scenario, an alternative complexity measure of the lattice may be the total number of paths in the lattice 205a. A person of ordinary skill in the relative art should appreciate that other complexity measures may be used.

The adaptation module 124 may also use the signal-to-noise ratio of the voice data to determine the configuration of the text prediction sources, or the order of the text prediction sources within the configuration. A high signal-to-noise ratio of the voice data may lead to reliable performance by the speech recognition module 110 and thus may be indicative of a reliable lattice 205a. As such, in the case of a high signal-to-noise ratio, the lattice decoder module 220a precedes the LM module in the determined configuration. If the signal-to-noise is low, the LM module 210a precedes the lattice decoder module 220a in the configuration determined by the adaptation module 124. In addition, a high signal-to-noise ratio may also be indicative of reliability of the text transcript 103 generated by the first agent, if available.

Figure 2B:
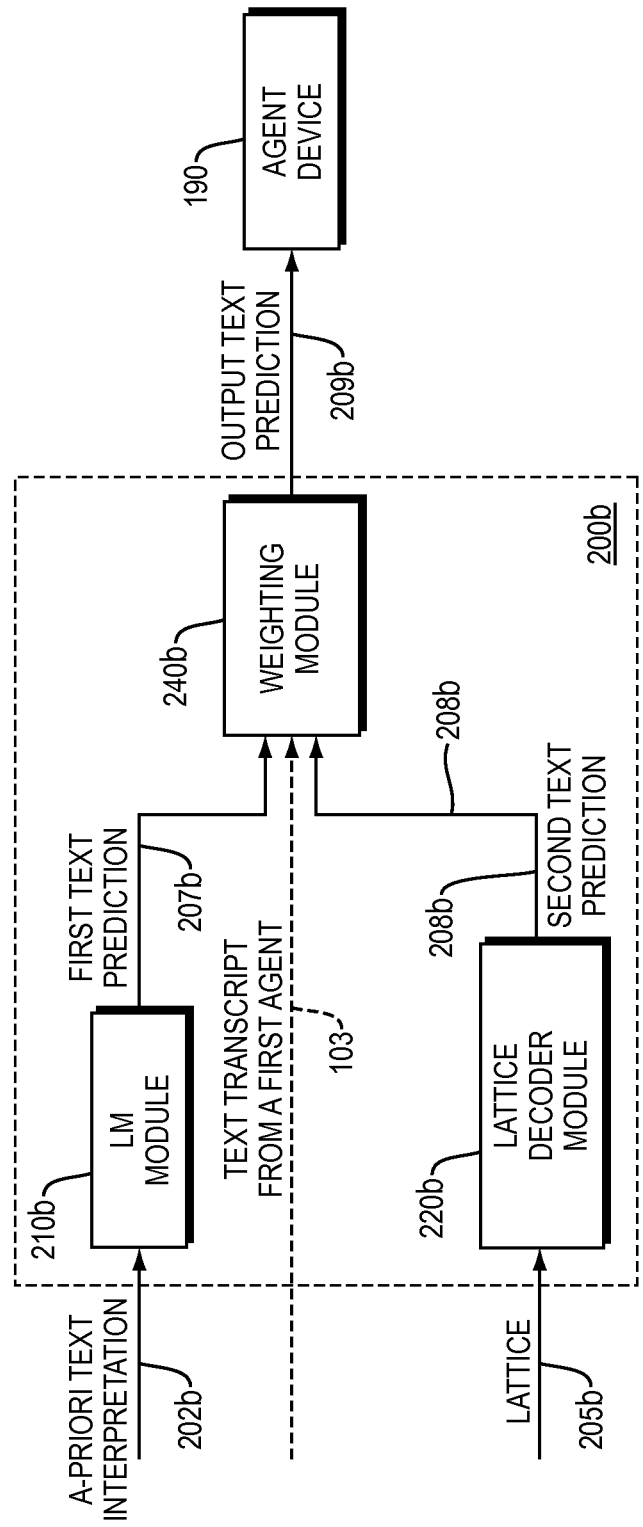
FIG. 2B is a block diagram illustrating another example adaptation of prediction sources for text transcription of voice data.

FIG. 2B is a block diagram illustrating an example configuration 200b of the multiple text prediction sources. In the configuration 200b, the LM module 210b and the lattice decoder module 220b are implemented in parallel. The a-priori text prediction 202b and the text transcript from a first agent are optional and the LM module 210b may still provide a first text prediction 207b with no a-priori text prediction 202b being fed to the LM module 210b. The text predictions 207b and 208b, e.g., outputs of the LM module 210b and the lattice decoder module 220b, respectively, are fed to a weighting module 240b. The weighting module 240b applies weightings, or assigns priority scores, to the text predictions 207b and 208b in order to generate output text prediction 209b. The weighting module 240b may further use the text transcript 103 generated by the first agent, if it's available, in generating the output text prediction 209b.

The weighting module 240b uses features 105 provided by the feature extraction module 130 to determine the weights to be applied to each of the text predictions, e.g., 207b and 208b, or transcripts, e.g., 103, provided to the weighting module 240b. Such features 105 include, for example, the signal-to-noise ratio of the voice data 101, the complexity of the lattice 205, a measure of the accuracy or quality of the text transcript 103, or the like. The weighting module 240b may further use other criteria in applying weighting, or assigning scores, to each of the text predictions, e.g., 207b and 208b, or transcripts, e.g., 103, provided to the weighting module 240b. For example, each of the text prediction sources, e.g., 210b and 220b, may generate more than one text prediction, e.g., 207b and 208b. In such case, the weighting module 240b may assign high scores, or apply large weighting, to a text prediction, or a portion of a text prediction, that is the output of more than one text prediction source. For example, a text prediction, or a sentence therein, that appears in the output of the LM module 210b and the lattice decoder module 220b is assigned a relatively higher score than another text prediction, or a sentence therein, that appears in the output of a single text prediction source among 210b and 220b. The weighting module 240b may process text predictions or portions of a text prediction when applying weightings or assigning priority scores.

In the case of a high signal-to-noise ratio of the voice data 101, text prediction(s) 208b generated by the lattice decoder module 220b is/are assigned higher priority scores, or larger weightings, than text prediction(s) 207b generated by the LM module 210b. In the case of a low signal-to-noise ratio of the voice data 101, however, text prediction(s) 207b generated by the LM module 210b is/are assigned higher priority scores, or larger weightings, than text prediction(s) 208b generated by the lattice decoder module 220b. Text prediction(s) 208b generated by the lattice decoder module 220b may also be assigned relatively high score(s), or relatively large weighting (s), if the lattice 205b has low complexity. However, if the lattice is determined to be complex, based on a complexity measure, the text prediction(s) 208b generated by the lattice decoder module 220b is assigned relatively low score(s), or relatively small weighting(s). The transcript 103, if provided to the weighting module 240b, may also be assigned a score or weighting. The weightings or scores are provided by the adaptation module 124 to the weighting module 240b.

FIGS. 3A and 3B show tables illustrating example weighting coefficients assigned to different prediction sources under different signal-to-noise ratios. The table in FIG. 3A corresponds to weightings or scores used in the case of low signal-to-noise ratio of the voice data 101. The first column of the table in FIG. 3A shows scores or weightings for the outputs of LM module 210b and the lattice decoder module only as no transcript from the first agent is provided. The text prediction (s) 207b from the LM module 210b is/are assigned a score or weighting of 1, while the text prediction(s) 208b from the lattice decoder module 220b is/are assigned a score of 0.75. Such scores may be used, for example, to rank the different inputs to the weighting module 240b and provide the highest ranked one as the output text prediction 209b. In the case where the LM module 210b, the lattice decoder module 220b, or both provide multiple text predictions with associated probability or likelihood values, the scores or weightings may be used in combination with such probability or likelihood values to determine the output text prediction 209b. For example, the probability or likelihood values may be multiplied with the corresponding weightings or scores to generate new scores to be used in determining the output text prediction 209b. Alternatively, a different rule or formula may be used to determine the output text prediction 209b. The second column of the table in FIG. 3A shows the scores 0.7, 0.9 and 1, assigned to the text prediction(s) 207b, the text prediction (s) 208*b*, and the transcript 103, respectively. The score values represent relative weights associated with different predictions.

The table in FIG. 3B illustrates examples scores or weightings used in the case of high signal-to-noise ratio of the voice data 101. The first column corresponds to the case where no text transcript 103 is provided by the first agent and the second column corresponds to the case where a text 103 transcript is provided by the first agent. Relatively high scores are assigned, in this case, to outputs from both the LM module 210*b* and the lattice decoder module 220*b*.

FIG. 4 is a flow chart illustrating a method 400 of text prediction according to at least one example embodiment. At block 410, a configuration of a plurality of prediction sources, used for text prediction, is determined based at least in part on one or more features 105 related to voice data 101 and/or one or more a-priori text interpretations. In determining the configuration, the features 105 may be analyzed, and a decision is then made based on the analysis of the features 105. One or more scores, or weightings, may be assigned to outputs of different text prediction sources based on the features 105 or the analysis thereof. The text prediction sources may be ranked based on the features 105. The method may further include extracting the features. At block 420, an output text prediction, e.g., 109, 208*a* or 209*b*, of the voice data 101 is generated using the plurality of prediction sources according to the determined configuration.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computerized method of performing adaptive textual prediction of voice data by a server, the computerized method comprising:
   determining a configuration of each of a plurality of prediction sources, used for respective textual interpretations of the voice data, based at least in part on one or more features associated with the voice data or one or more a-priori interpretations of the voice data; and
   combining the respective textual interpretations output by the plurality of prediction sources to generate a textual output prediction of the voice data according to the determined configurations of the plurality of prediction sources.

2. A computerized method according to claim 1 further comprising extracting the one or more features associated with the voice data or, from the voice data, the one or more a-priori interpretations of the voice data.

3. A computerized method according to claim 1, wherein the one or more features include at least one of the following:
   a signal-to-noise ratio associated with the voice data;
   a complexity measure of a lattice representing at least one a-priori interpretation of the voice data; and
   an a-priori interpretation of the voice message generated by a human agent.

4. A computerized method according to claim 1, wherein the multiple prediction sources include at least one of the following:
- a language model module;
- a lattice decoder module; and
- a human agent.

5. A computerized method according to claim 1 further comprising presenting the textual output prediction to a human agent.

6. A computerized method according to claim 1, wherein determining the configuration of a plurality of prediction sources includes at least one of the following:
- determining an order according to which the plurality of prediction sources are to be applied;
- determining weightings associated with the multiple prediction sources; and
- determining a subset of the plurality of prediction sources for use in generating the textual output prediction.

7. A computerized method according to claim 1 further comprising at least one of the following:
- sending a representation of the configuration determined to another device;
- storing a representation of the configuration determined; and
- updating a database storing a representation of a previous configuration of the plurality of prediction sources based on the configuration determined.

8. A computerized method according to claim 7, wherein a representation of the configuration determined includes at least one of the following:
- indication of an order according to which the multiple prediction sources being applied;
- indication of weightings associated with the multiple prediction sources; and
- indication of a subset of the plurality of prediction sources for use in generating the textual output prediction.

9. A computer server for performing adaptive textual prediction of speech signals, the computer server comprising:
- a memory storing computer code instructions thereon; and
- a processor,
- the memory, with the computer code instructions, and the processor being configured to cause the server to:
  - determine a configuration of each of a plurality of prediction sources, used for respective textual interpretations of the voice data, based at least in part on one or more features associated with at least one of the voice data and one or more a-priori interpretations of the voice data; and
  - combine the respective textual interpretations output by the plurality of prediction sources to generate a textual output prediction of the voice data according to the determined configurations of the plurality of prediction sources.

10. A computer server according to claim 9, wherein the memory, with the computer code instructions, and the processor are configured further to extract the one or more features associated with the voice data or, from the voice data, the one or more a-priori interpretations of the voice data.

11. A computer server according to claim 9, wherein the one or more features include at least one of the following:
- a signal-to-noise ratio associated with the voice data;
- a complexity measure of a lattice representing at least one a-priori interpretation of the voice data; and
- an a-priori interpretation of the voice message generated by a human agent.

12. A computer server according to claim 9, wherein the multiple prediction sources include at least one of the following:
- a language model module;
- a lattice decoder module; and
- a human agent.

13. A computer server according to claim 9, wherein the memory, with the computer code instructions, and the processor being configured to further present the textual output prediction to a human agent.

14. A computer server according to claim 9, wherein, in determining the configuration of the plurality of prediction sources, the memory, with the computer code instructions, and the processor are configured further to perform at least one of the following:
- determine an order according to which the plurality of prediction sources are to be applied;
- determine weightings associated with the multiple prediction sources; and
- determine a subset of the plurality of prediction sources for use in generating the textual output prediction.

15. A computer server according to claim 9, wherein the memory, with the computer code instructions, and the processor are configured further to perform at least one of the following:
- send a representation of the configuration determined to another device;
- store a representation of the configuration determined; and
- update a database storing a representation of a previous configuration of the plurality of prediction sources based on the configuration determined.

16. A computer server according to claim 9, wherein a representation of the configuration determined includes at least one of the following:
- an indication of an order according to which the multiple prediction sources are to be applied;
- an indication of weightings associated with the multiple prediction sources; and
- an indication of a subset of the plurality of prediction sources for use in generating the textual output prediction.

17. A non-transitory computer-readable medium including computer code instructions stored thereon, the computer code instructions, when executed by a processor, cause an apparatus to perform at least the following:
- determining a configuration of each of a plurality of prediction sources, used for respective textual interpretations of the voice data, based at least in part on one or more features associated with at least one of the voice data and one or more a-priori interpretations of the voice data; and
- combining the respective textual interpretations output by the plurality of prediction sources to generate a textual output prediction of the voice data according to the determined configurations of the plurality of prediction sources.

18. A non-transitory computer-readable medium according to claim 17, wherein the computer code instructions, when executed by the processor, cause the apparatus further to extract the one or more features associated with the voice data or, from the voice data, the one or more a-priori interpretations of the voice data.

19. A non-transitory computer-readable medium according to claim 17, wherein the one or more features include at least one of the following:
- a signal-to-noise ratio associated with the voice data;

a complexity measure of a lattice representing at least one a-priori interpretation of the voice data; and an a-priori interpretation of the voice message generated by a human agent.

20. A non-transitory computer-readable medium according to claim 17, wherein the multiple prediction sources include at least one of the following:

a language model module;
a lattice decoder module; and
a human agent.

* * * * *